(12) United States Patent
Krueger

(10) Patent No.: US 12,509,143 B2
(45) Date of Patent: Dec. 30, 2025

(54) METHOD FOR OPERATING A STEERING SYSTEM, STEERING SYSTEM, AND VEHICLE

(71) Applicant: ZF Automotive Germany GmbH, Alfdorf (DE)

(72) Inventor: Bernd Krueger, Willich (DE)

(73) Assignee: ZF Automotive Germany GmbH, Alfdorf (DE)

( * ) Notice: Subject to any disclaimer, the term of this patent is extended or adjusted under 35 U.S.C. 154(b) by 106 days.

(21) Appl. No.: 18/618,054

(22) Filed: Mar. 27, 2024

(65) Prior Publication Data

US 2024/0326902 A1    Oct. 3, 2024

(30) Foreign Application Priority Data

Mar. 29, 2023   (DE) .......................... 102023202881.6

(51) Int. Cl.
B62D 5/04    (2006.01)

(52) U.S. Cl.
CPC .......... B62D 5/0484 (2013.01); B62D 5/046 (2013.01); B62D 5/0481 (2013.01); B62D 5/0487 (2013.01)

(58) Field of Classification Search
CPC .... B62D 5/0484; B62D 5/046; B62D 5/0481; B62D 5/0487
See application file for complete search history.

(56) References Cited

U.S. PATENT DOCUMENTS

| | | | |
|---|---|---|---|
| 2009/0066286 A1* | 3/2009 | Gunji | B62D 5/0487 318/490 |
| 2011/0156626 A1* | 6/2011 | Mukai | B62D 5/0487 318/400.21 |
| 2013/0257232 A1* | 10/2013 | Tomizawa | H02K 29/08 310/68 R |
| 2013/0320905 A1* | 12/2013 | Uryu | H02K 11/20 318/490 |
| 2017/0012569 A1* | 1/2017 | Koseki | H02P 25/22 |
| 2018/0208237 A1* | 7/2018 | Kumagai | H02M 7/48 |
| 2019/0028053 A1* | 1/2019 | Akutsu | B62D 5/0484 |
| 2020/0136543 A1* | 4/2020 | Kawamura | H02P 21/22 |
| 2021/0044245 A1* | 2/2021 | Okubo | H02P 29/028 |
| 2021/0300464 A1* | 9/2021 | Kodera | B62D 5/0487 |
| 2023/0109098 A1* | 4/2023 | Terashima | B62D 5/0421 701/41 |

FOREIGN PATENT DOCUMENTS

| | | |
|---|---|---|
| DE | 102010061501 A1 | 6/2011 |
| DE | 112015000872 T5 | 12/2016 |

* cited by examiner

Primary Examiner — Phutthiwat Wongwian
Assistant Examiner — Susan E Scharpf
(74) Attorney, Agent, or Firm — Kristin L. Murphy

(57) ABSTRACT

The present disclosure relates to a method for operating a steering system, a steering system and to a vehicle. The steering system comprises at least one steering device that is able to be adjusted by way of at least one electric motor that is driven by a power converter. The power converter has at least two regulation tracks each having at least one set of windings, at least one sensor assigned to the set of windings, a control device and a plurality of switching devices. The control devices, which are assigned to different regulation tracks, are coupled to one another by way of a coupling device.

14 Claims, 4 Drawing Sheets

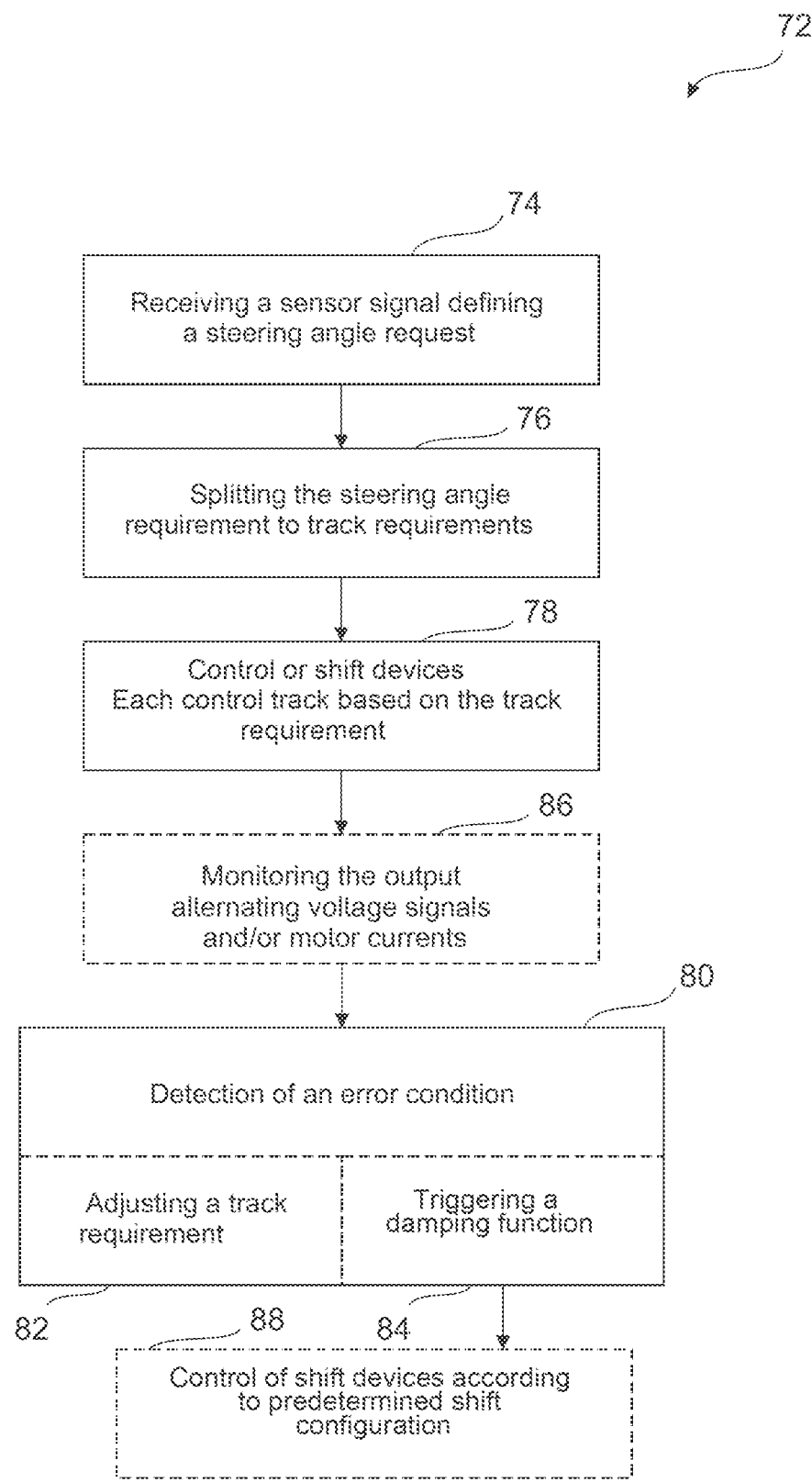

METHOD FOR OPERATING A STEERING SYSTEM, STEERING SYSTEM, AND VEHICLE

CROSS-REFERENCE TO RELATED APPLICATION

This application claims priority to German Priority Application No. 102023202881.6, filed Mar. 29, 2023, the disclosure of which is incorporated herein by reference in its entirety.

TECHNICAL FIELD

The present disclosure relates to a method for operating a steering system, to a steering system and to a vehicle.

BACKGROUND

In existing steer-by-wire steering systems, there is a need to delay a total failure of the steering system as far as possible in the event of a fault in order to ensure that the underlying vehicle is able to be steered for as long as possible. For this purpose, electrical circuits that are used to actuate an electric motor of the respective steering system, for example commutation cells of power converters, are switched in the event of a fault, such that intrinsic damping of the electrical circuit is brought about, thereby enabling a steering capability for a longer time. Such a switching configuration may be ensured by actuating the circuit breakers (transistors) of the power converters in an appropriate manner.

Known damping mechanisms however require the respective circuit breakers to be able to be actuated, for example via their gate signals. If actuation is no longer possible, it is impossible, using previous damping concepts, to ensure a switching configuration intended for the event of a fault.

There is therefore a need to eliminate or at least reduce the disadvantages of the prior art. For example, there is a need to provide enhanced and improved arrangements in the event of a fault, by way of which it is possible to ensure a steering capability of the steering system for a longer time, even in the event of it no longer being possible to actuate at least some of the circuit breakers.

SUMMARY

An exemplary arrangement of the disclosure is shown in the independent patent claims. Advantageous, and exemplary arrangements are specified in the dependent patent claims and the following description, each of which may represent aspects of the disclosure on their own or in (sub)combination. Some aspects are explained with regard to different variants. However, the features should be transferred to one another.

According to one exemplary aspect, provision is made for a method for operating a steering system. The steering system comprises at least one steering device. The steering device is able to be adjusted by way of at least one electric motor that is driven by a power converter. The power converter has at least two regulation tracks each having at least one set of windings, at least one sensor assigned to the set of windings, a control device and a plurality of switching devices. The control devices, which are assigned to different regulation tracks, are coupled to one another by way of a coupling device. The method comprises at least the following steps:

At least one sensor signal is received from the respective sensor of a regulation track and/or one drive signal is received from a vehicle control device. A steering angle requirement is determined for the steering system based on the sensor signal and/or the drive signal (step A).

The steering angle requirement is divided into track requirements by way of the coupling device, which provides the track requirements to the control devices of the different regulation tracks, which are assigned to different sets of windings (step B).

The switching devices of a regulation track, which are each assigned to a set of windings, are controlled by control signals of the respectively assigned control device such that motor currents are output to the respective set of windings of the regulation track, which motor currents correspond to the respective track requirement (step C).

A fault state of the steering system is detected, wherein, depending on the detected fault state (step D)
a. at least one adapted track requirement is output to at least one control device for at least one regulation track, and/or
b. a damping function is applied for at least one set of windings of a regulation track.

The method set up in this way advantageously provides an enhanced catalog of measures in the event of a fault. For this purpose, redundancy is first provided using multiple regulation tracks that have different sets of windings. The electric motor is thereby able to be operated (in some cases with reduced power) based on the different regulation tracks, essentially independently of one another. Only the entire steering angle requirement is divided among the respective regulation tracks, such that the steering angles (torques) provided jointly by the different regulation tracks correspond in total to the steering angle requirement.

The plurality of regulation tracks advantageously make it possible, in the event of a fault, to provide a variation in the respective track requirements, if for example a particular regulation track is no longer able to meet the respective track requirement due to a fault that impacts only this particular regulation track. In this case, adapted track requirements may be provided for other regulation tracks in order to compensate at least partially for the failure (or the power reduction of faulty regulation tracks). The redundancy advantageously ensures the steering capability for longer periods in the event of a fault.

In addition, a damping function may be used to further extend the period of the steering capability in the event of a fault. This optimizes the steering capability in the event of a fault.

Optionally, a first regulation track may be assigned for example to a front-axle steering system of a vehicle. The second regulation track may then be assigned to an alternative steering device, for example a rear-axle steering system or a steering device that is implemented by individual or multiple braking devices.

In this case, in the event of failure of the first regulation track or of the front-axle steering system to which the first regulation track is assigned, the second regulation track may be used to still ensure, at least to a certain extent, the steering capability of the vehicle, for example by way of the rear-axle steering system or targeted actuation of individual or multiple braking devices, so as to bring about a steering movement of the vehicle.

If the steering behavior of the vehicle is ensured definitively by the second regulation track due to a fault occurring in connection with the first regulation track, damping may be used to ensure that the steering device assigned to the first regulation track (for example the front-axle steering system) has its movement damped, thereby increasing the influence of the steering device that is assigned to the second regulation track relative to the steering device that is assigned to the first regulation track.

The steering capability of the vehicle is thereby improved overall despite the presence of a fault, for example, despite a failure or impairment of the front-axle steering system.

The steering device may comprise both a steering angle input device and a steering angle output device, for example a steering wheel of a vehicle or a steering device that is coupled to a steering axle of the vehicle in order to control steerable wheels.

The electric motor may be operated both in a motor operating mode and in a recuperation mode.

The power converter may be a converter. By way of example, the converter may receive a DC voltage from an energy storage device as input signals and be configured to provide motor currents to be applied to the windings of the sets of windings as output signals.

The switching devices may be electrical components that are configured to allow or prevent a current flow. By way of example, the switching devices may comprise diodes or transistors.

While the control devices are basically configured to actuate the switching devices of the respective regulation track such that the motor currents are provided in order to serve or to meet the respective track requirement, the coupling device has a superordinate functionality with respect to the control devices of the different regulation tracks. The coupling device may divide the entire steering angle requirement proportionally among the individual regulation tracks, such that the respective control devices adapt the respective control to the track requirement specified by the coupling device.

The vehicle control device may be understood to be a generally superordinate component of the vehicle that ensures superordinate vehicle control functions. By way of example, the vehicle control device may be configured to receive an acceleration specification or a steering angle specification from a vehicle driver. The vehicle control device may then further process the received variables and output suitable drive signals to the corresponding devices or their control components, for example the control devices of the different regulation tracks of the steering system or the coupling device.

A damping function may be understood here to mean that a predetermined switching configuration is set for at least part of a regulation track. By way of example, the switching devices may be switched into predefined switching states so that a damping function is ensured for a commutation cell of a regulation track.

Optionally, the damping function for a set of windings of a regulation track is triggered by the control device respectively assigned to the regulation track. As an alternative, the damping function may also be triggered by other components, for example the coupling device.

In some exemplary arrangements, the triggering of the damping function is communicated to other components of the steering system through notification. By way of example, such a notification may be transmitted from a control device of a regulation track to the coupling device.

In one exemplary arrangement, the output motor currents are monitored, for example by being captured by way of one or more motor sensors, which optionally captures or capture a motor position. A fault state is then triggered if the motor currents deviate from a respective standard interval. The motor currents output by the regulation tracks to the windings of the sets of windings are typically within respective standard intervals in terms of their amplitude, these intervals ensuring that the windings are actuated as required in order to enable an optimized torque output. This makes it possible to detect faults in which the output motor currents deviate from a respective standard interval. Furthermore, monitoring and capturing the motor currents makes it possible to use these motor currents in closed control loops in order to serve the respective track requirement by appropriately adapting the output motor currents as required.

Provision may be made, with regard to the standard interval, for threshold values, the respective standard interval being considered to be breached when said threshold values are fallen below or exceeded.

Optionally, provision may be made for different standard intervals for different output motor currents.

As an alternative, the same standard intervals may be provided for all output motor currents.

In some exemplary arrangements, if a fault state of a regulation track is detected, the at least one adapted track requirement is such that a failure of the faulty regulation track is compensated for with regard to the steering angle requirement. This means that other regulation tracks compensate for the share of the failed regulation track by way of a correspondingly adapted track requirement. This advantageously enables the full steering capability, even in the event of failure of a regulation track.

The method may be developed further by virtue of the steering system having a front-axle steering device and/or a steering angle input device (steering wheel, joystick or the like). It is then possible to trigger a damping function for the front-axle steering device only if a fault state is detected in which none of the regulation tracks that are assigned to the front-axle steering device outputs motor currents such that the steering angle requirement is ensured. In addition, it is possible to trigger a damping function for the steering angle input device if a fault state is detected in which at least one of the regulation tracks that are assigned to the steering angle input device outputs motor currents such that the respective track requirement is not ensured.

Drive-by-wire steering systems have steering devices for different purposes.

On the one hand, a steering angle specification has to be captured, for example by way of a steering wheel. Steering systems may therefore have steering devices that are configured as a steering angle input device. In order to provide the driver with a natural driving sensation, steering angle input devices have electric motors by way of which the steering movements of the vehicle are simulated by providing corresponding torques that act on the steering angle input device. By way of example, it is thus possible to simulate cornering by generating a resetting torque on the steering wheel in the direction of a normal position (zero position), against which the driver has to deflect the steering wheel in order to produce a steering angle specification other than zero, based on which a steering requirement is defined.

On the other hand, steerable wheels of the vehicle (typically the front wheels) have to be deflected from a zero position (straight-ahead position) in accordance with the steering requirement. This requires a front-axle steering device, which in turn has an electric motor. The steerable wheels may for example be coupled to a steering rod that is able to be deflected by the front-axle steering device.

As an alternative, the front-axle steering device may also be formed by a steering device that, for each individual steerable wheel, has an electric motor assigned to the wheel. The individual wheels may thus be deflected independently of one another.

As an alternative, provision may also be made for a rear-axle steering device instead of the front-axle steering device, provided that the vehicle has steerable rear wheels.

Provision may also be made for both a front-axle steering device and a rear-axle steering device or a device that has respectively assigned steering devices for all of the wheels of the vehicle. This may be the case for example for special-purpose vehicles.

Optionally, windings of the set of windings for which the damping function is triggered are short-circuited using the switching devices assigned to the set of windings. A short circuit is ensured for the assigned switching devices by at least one predetermined switching configuration. The short-circuiting of the windings ensures intrinsic damping of the respective part of the underlying electrical circuit. This makes it possible to extend the period for which the steering system is generally still able to be used in order to meet a steering angle specification as well as possible.

In one exemplary arrangement, each switching device has a transistor, for example a field-effect transistor.

The power converter may have a B6 bridge comprising three half-bridges for each regulation track. Each half-bridge has a first high-side switching device, a second low-side switching device and a center tap arranged between them for outputting a respective motor current. The at least one predetermined switching configuration comprises predetermined switching states of the switching devices of the half-bridges of the B6 bridge. A B6 bridge may be used to provide motor currents for 3n-phase electric motors in a reliable manner (n being a natural number). In addition, windings may be short-circuited by appropriate switching positions of the respective high-side switching device and of the respective corresponding low-side switching device.

In one exemplary arrangement, different fault states are detected depending on states of the switching devices of the half-bridges of the B6 bridge. Depending on the detected fault state, provision is then made for different predetermined switching configurations (variants).

For example, in one exemplary arrangement, all remaining high-side switching devices are switched on and all remaining low-side switching devices are switched off, if a short circuit is detected for a high-side switching device of a half-bridge (variant 1).

In another exemplary arrangement, all remaining high-side switching devices are switched off and all remaining low-side switching devices are switched on, if a short circuit is detected for a low-side switching device of a half-bridge (variant 2).

In a further exemplary arrangement, all remaining high-side switching devices are switched off and all remaining low-side switching devices are switched on, if an interruption is detected for a high-side switching device of a half-bridge (variant 3).

In another exemplary arrangement, all remaining high-side switching devices are switched on and all remaining low-side switching devices are switched off, if an interruption is detected for a low-side switching device of a half-bridge (variant 4).

The deviating different fault states may therefore also comprise different interruptions of the switching devices. The damping function may thereby be ensured as best possible depending on the specific fault state, including with regard to the respective fault state. The duration of the steering capability may thus be optimized depending on the respective fault state, even in the event of a fault.

An interruption, also called "open circuit", is present here when a switching device is no longer able to be switched on, for example because an output gate signal (gate voltage) no longer influences the switching device in the desired way. The predetermined switching devices may therefore take into account all possible different fault states of the switching devices of the power converter.

The fault states of the switching devices may be captured by way of test voltages or sensors by way of which the switching position of a respective switching device is checked depending on the gate signal output by a control device to the switching device.

In one exemplary arrangement, faulty switching devices of a regulation track are detected by at least one sensor assigned to the control device of the regulation track. The control device then outputs a corresponding fault signal to the coupling device. The coupling device then outputs an adapted track requirement to at least one other control device in order to compensate for the failure of the faulty regulation track. It is thereby possible, even in the event of faults that are caused by faulty switching devices, to meet the steering angle requirement as best possible as a result of the redundancy and to compensate for the failure.

The method as described above is may be carried out in a computer-implemented manner. For example, the control devices and/or the coupling device may have appropriate data processing devices.

According to a further aspect, provision is also made for a computer program containing commands that, when executed by a data processing device of the control device and the coupling device, prompt same to carry out the method as described above.

According to a further aspect, provision is also made for a storage medium containing the computer program as described above, such that said computer program, when executed by one or more data processing devices, prompts same to carry out the method as described above.

According to a further aspect, provision is also made for a steering system. The steering system comprises at least one steering device that is able to be adjusted by way of at least one electric motor that is driven by a power converter. The power converter has at least two regulation tracks each having at least one set of windings, at least one sensor assigned to the set of windings, a control device and a plurality of switching devices. The control devices, which are assigned to different regulation tracks, are coupled to one another by way of a coupling device. The steering system is configured to carry out the method as described above by way of the coupling device, the control devices, the sensors and the switching devices. The steering system therefore enables the advantages that were listed in relation to the method described above.

The steering system furthermore has phase isolation devices that act between half-bridges of B6 bridges and the electric motor and are configured to isolate the half-bridges from the electric motor in the event of a short circuit of one of the switching devices. By way of example, the phase isolation devices may be arranged at the output of the center taps of the half-bridges. Disconnection of a half-bridge from the electric motor may thereby be ensured.

According to a further aspect, provision is also made for a vehicle having a steering system as described above or having a steering system that is operated according to the method as described above. The vehicle is able to be steered for a longer time in the event of a fault by the steering system configured in this way.

Optionally, the vehicle may comprise a motor vehicle, that is to say a road vehicle. As an alternative, the vehicle may also comprise other vehicle types, for example aircraft, ships, two-wheeled vehicles, motorcycles or the like. Overall, a vehicle is understood here to mean a device that is configured to transport objects, cargo or people between different destinations. Examples of vehicles are land vehicles such as motor vehicles, electric vehicles, hybrid vehicles or the like, rail vehicles, aircraft or watercraft. Preferably, vehicles in this context may be considered to be road-bound vehicles, such as for example cars, trucks, buses or the like.

All of the features explained with regard to the various aspects may be combined on their own or in (sub) combination with other aspects.

BRIEF DESCRIPTION OF DRAWINGS

The disclosure, along with further advantageous exemplary arrangements and developments thereof, will be described and explained in more detail below with reference to the examples illustrated in the drawings, in which:

FIG. 4 shows a simplified schematic illustration of a method according to the disclosure for operating a steering system.

All the features disclosed below with reference to the exemplary arrangement and/or the accompanying figure may be combined on their own or in any subcombination with features of the aspects of the present disclosure, including features of preferred arrangements, provided that the resulting combination of features makes sense to a person skilled in the art in the technical field.

DETAILED DESCRIPTION

Figure 1:
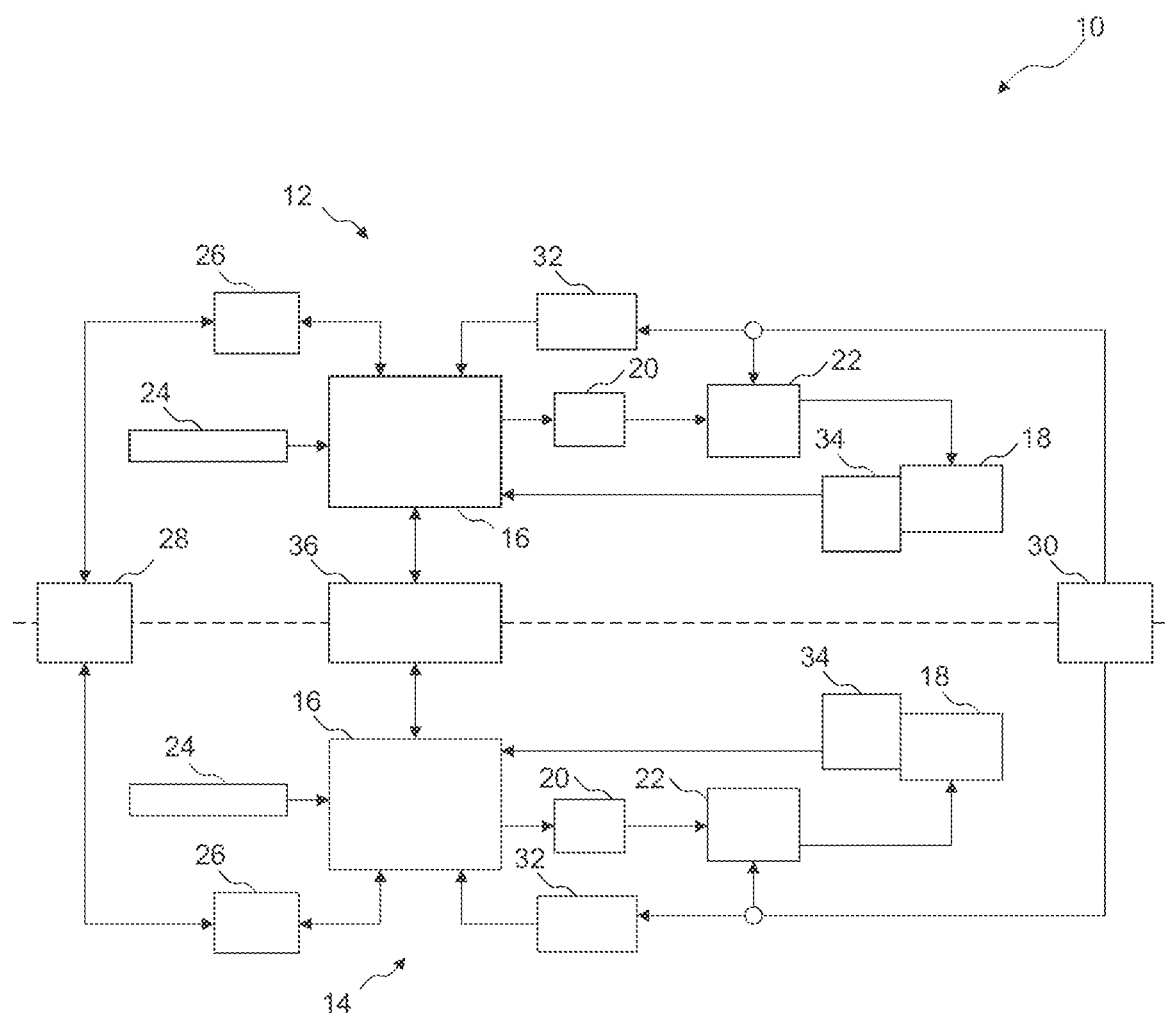
FIG. 1 shows a simplified schematic illustration of a power converter of a steering system according to the disclosure.

FIG. 1 shows a simplified schematic illustration of a power converter 10 of a steering system according to the disclosure.

The power converter 10 in this case comprises a first regulation track 12 and a second regulation track 14. Generally speaking, the power converter 10 may also have more regulation tracks.

Each regulation track 12, 14 in this case has a control device 16 and a set of windings 18 as part of a motor. The motor is part of a steering device of the steering system. Each set of windings 18 comprises multiple windings. The sets of windings are 3n-phase here. The sets of windings 18 of different regulation tracks 12, 14 may be part of a single electric motor. By way of example, the motor may be 6-phase, whereas the sets of windings 18 are each 3-phase. Nevertheless, both sets of windings 18 may be arranged within the same motor.

The control device 16 of each regulation track 12, 14 is coupled to a bridge driver 20, which may also be part of the respective control device 16. In addition, each regulation track 12, 14 has a bridge circuit 22, which is coupled to the respective bridge driver 20.

Motor currents for the respective set of windings 18 are provided by the respective bridge circuit 22. Each bridge circuit 22 comprises multiple switching devices, the switching positions of which are influenced by the bridge driver 20.

The power converter 10 additionally comprises a sensor 24 for each regulation track 12, 14. The sensor 24 is configured to capture a steering angle requirement and to transmit this to the control device 16 of the respective regulation track 12, 14.

The respective regulation track 12, 14 of the power converter 10 is furthermore coupled to a data bus 26, which is in turn coupled to a vehicle control device 28. The power converter 10 may also receive a steering angle requirement from the vehicle control device 28 via the data bus 26 instead of using the sensor 24. The sensor 24 may also be coupled to the vehicle control device 28 instead of to the respective control device 16.

The power converter 10 is furthermore coupled to a voltage supply 30 that is not part of the steering system. The voltage supply 30 may be ensured for example by an energy storage device of a vehicle. The voltage supply 30 provides DC voltages that are supplied to the bridge circuit 22. This means that the bridge circuit 22 also receives a DC voltage as input signals.

Optionally, different voltage supplies 30 may be provided for each regulation track 12, 14. By way of example, a vehicle may have multiple energy storage devices, by way of which the regulation tracks 12, 14 are able to be supplied with DC voltages independently of one another.

Provision is furthermore made for a power supply unit 32, for which the voltage supply 30 likewise provides an input voltage. The power supply unit 32 is configured to apply a supply voltage to the control device 16 of the respective regulation track 12, 14.

Each regulation track 12, 14 additionally has a motor sensor 34 that captures (monitors) the motor currents and optionally the rotor position of the motor. The motor sensor 34 transmits the captured motor currents and optionally the rotor angle to the control device 16.

The control device 16 is configured to compare the captured motor currents with standard intervals and to determine whether the captured motor currents are within the standard intervals, or the respective threshold values are fallen below or exceeded.

The power converter 10 furthermore comprises a coupling device 36 that is coupled to the control devices 16 of different regulation tracks 12, 14.

The control devices 16 transmit the respective steering angle requirement to the coupling device 36. The coupling device 36 is configured, based on the steering angle requirement for each regulation track 12, 14, to determine a respective track requirement. The steering angle requirement for the steering system is thus divided among the respective regulation tracks 12, 14. The track requirements are transmitted to the respective control devices 16.

The control devices 16 are configured to determine, based on the captured motor currents through a closed control loop, the way in which the motor currents output by the bridge circuit 22 should be varied in order to meet the respective track requirement.

Figure 2:
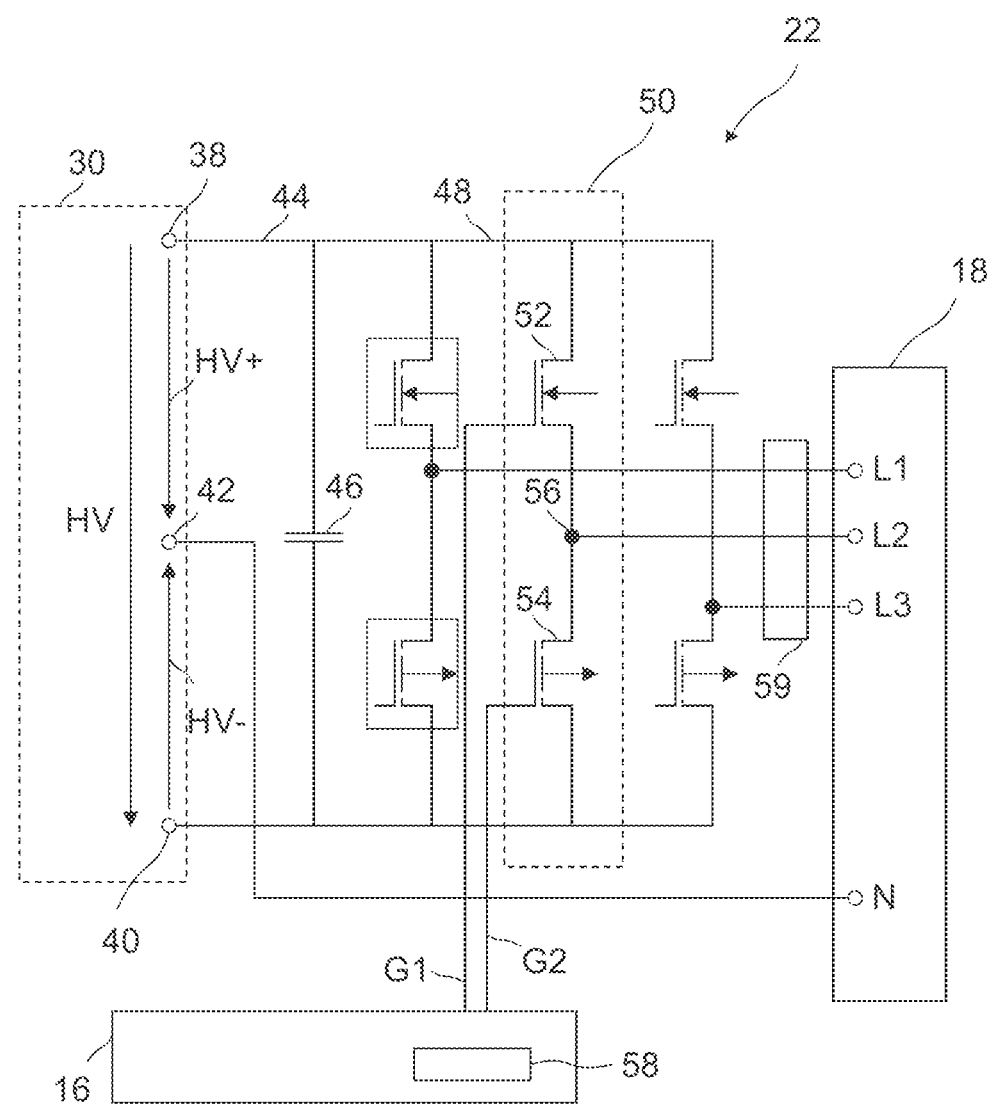
FIG. 2 shows a simplified schematic illustration of part of the steering system according to the disclosure.

FIG. 2 shows a simplified schematic illustration of part of the steering system according to the disclosure.

The bridge circuit 22 of a regulation track 12, 14 here comprises a B6 bridge 44 comprising three half-bridges 50. The following functionality is set forth only with reference to one half-bridge 50, but should be transferred accordingly to all of the half-bridges 50 of the B6 bridge 44.

Each half-bridge 50 here comprises a first switching device 52 (field-effect transistor), which acts as a high-side switch, and a second switching device 54 (field-effect transistor), which acts as a low-side switch. Between the first switching device 52 and the second switching device 54, each half-bridge 50 comprises a center tap 56 for providing an AC voltage signal, here L2, for a set of windings 18.

The three half-bridges 50 apply three corresponding AC voltage signals, L1, L2 and L3, to the windings of the set of windings 18 of the electric motor.

Another regulation track 12, 14 provides additional motor currents for another set of windings 18 of the electric motor by way of its bridge circuit 22.

Different topologies, for example six-phase bridge circuits 22, are however, likewise possible.

The respective half-bridges 50 are coupled to a busbar structure 48 of the bridge circuit 22. The bridge circuit 22 is coupled to a voltage supply 30, for example by way of an energy storage device. The voltage supply 30 comprises connection terminals 38, 40, between which a voltage VS is provided.

In addition, the bridge circuit 22 comprises a DC link capacitor 46, which serves to stabilize the DC link voltage during fast transient processes.

Depending on the switching positions of the switching devices 52, 54, when HV+ or HV− are applied, corresponding commutation cells are formed in the bridge circuit 22.

The bridge circuit 22 here furthermore has phase isolation devices 59, which act between half-bridges 50 and the electric motor and are arranged at the output of the center taps 56. The phase isolation device 59 here is a combination solution for all of the half-bridges 50. However, provision may also be made for individual phase isolation devices 59. The phase isolation devices 59 are configured to isolate the half-bridges 50 from the electric motor in the event of a short circuit of one of the switching devices 52, 54 of the respective half-bridge 50.

In order to control the switching positions of the switching devices 52, 54, the bridge circuit 22 is coupled at least indirectly to the control device 16 of the respective regulation track 12, 14, which comprises at least one data processing device 58.

The control device 16 is configured, together with the bridge driver 20, to provide corresponding gate signals G1, G2 as switching signals for the switching devices 52, 54 such that the switching positions of the switching devices 52, 54 are influenced based on these gate signals.

The control device 16 is additionally coupled to the motor sensor 34, from which it receives the captured motor currents and optionally the rotor position. The control device 16 may then output corresponding gate signals G1, G2, for example depending on the relative positions of the rotor of the electric motor in relation to the stator of the electric motor, such that, as a result, the windings of the set of windings 18 are actuated as required.

Figure 3:
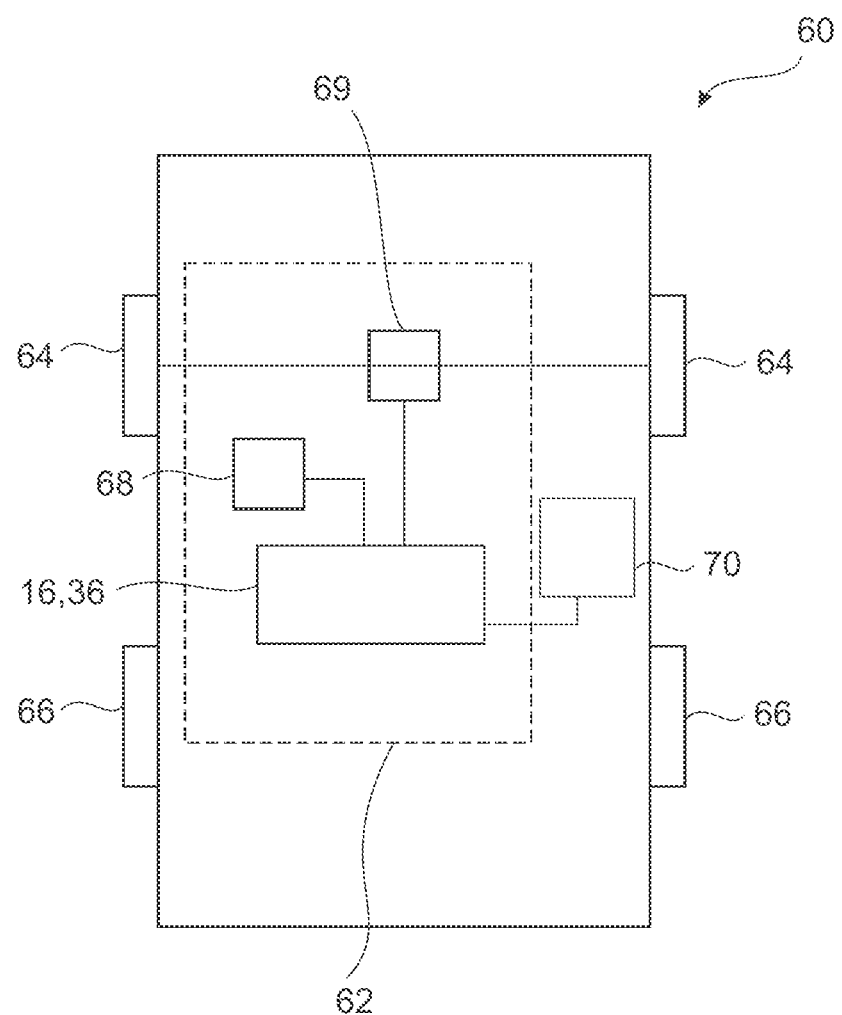
FIG. 3 shows a simplified schematic illustration of a vehicle according to the disclosure.

FIG. 3 shows a simplified schematic illustration of a vehicle 60 according to the disclosure having a steering system 62.

The vehicle has front wheels 64 and rear wheels 66. The front wheels 64 are steerable here.

The steering system 62 comprises two steering devices here. Respectively corresponding regulation tracks 12, 14 are provided for a steering angle input device 68 and a front-axle steering device 69. This means that a power converter 10 having respective regulation tracks 12, 14 is provided for each steering device.

A steering request from the driver may be captured by way of the steering angle input device 68. This defines a steering angle specification. In addition, it is possible to simulate a driving behavior of the vehicle 60 on the steering angle input device 68 for the driver by way of an electric motor.

The front-axle steering device 69 is configured to enable a deflection of the front wheels 64 based on the steering angle specification.

The steering system 62 is furthermore coupled here to a vehicle control device 70. The steering system 62 may likewise receive a steering angle requirement using the vehicle control device 70, for example in the event of intervention of a driving dynamics control functionality.

FIG. 4 shows a simplified schematic illustration of a method 72 according to the disclosure for operating a steering system 62. Optional steps are illustrated in dashed form.

In step 74, at least one sensor signal is received from the respective sensor 24 of a regulation track 12, 14 and/or one drive signal is received from a vehicle control device 70. A steering angle requirement is determined for the steering system 62 based on the sensor signal and/or the drive signal.

In step 76, the steering angle requirement is divided into track requirements by way of the coupling device 36, which provides the track requirements to the control devices 16 of the different regulation tracks 12, 14, which are assigned to different sets of windings 18.

In step 78, switching devices 52, 54 of a regulation track 12, 14, which are each assigned to a set of windings 18, are controlled by control signals of the respectively assigned control device 16 such that motor currents are output to the respective set of windings 18 of the regulation track 12, 14, which motor currents correspond to the respective track requirement.

In step 80, a fault state of the steering system 62 is detected.

Depending on the detected fault state, according to option 82, at least one adapted track requirement is output to at least one control device 16 for at least one regulation track 12, 14.

As an alternative or in addition, according to option 84, a damping function is applied for at least one set of windings 18 of a regulation track 12, 14.

The damping function may ensure that a set of windings 18 is short-circuited.

The adapted track requirement may be such that the failure of another regulation track 12, 14 is compensated for.

Option 84 depends on the type of steering device. In the case of a steering angle input device 68, the damping function may be triggered if at least one regulation track 12, 14 is faulty. In the case of a front-axle steering device 69, a damping function according to option 84 may be triggered only if all regulation tracks 12, 14 are faulty. This means that, in the case of a front-axle steering device 69, adapted track requirements are output first if not all regulation tracks 12, 14 are faulty at the same time.

Optionally, the method 72 may be developed further by step 86. The AC voltage signals and/or motor currents output to a set of windings 18 by the bridge circuit 22 for each regulation track 12, 14 are then monitored. The respective control device 16 is then configured to compare the captured motor currents with standard intervals and to establish whether the motor currents are within the standard intervals. If the standard intervals are breached, a fault state is triggered. Provision may be made, based on the detected fault state, to adapt a track requirement or to trigger a damping function according to options 82, 84.

The damping function may be ensured, according to option 84, by step 88, in which the switching devices 52, 54 are actuated in accordance with predetermined switching configurations. This takes into account the respectively detected fault state. For example, different switching configurations are provided for faulty switching devices 52, 54. In step 88, in this regard, the actuation of the switching devices 52, 54 in accordance with a respectively predetermined switching configuration may depend on the respectively detected fault state.

The predetermined switching configurations of step 88 comprise at least the following four variants.

All remaining high-side switching devices 52 are switched on and all remaining low-side switching devices 54 are switched off, if a short circuit is detected for a high-side switching device 52 of a half-bridge 50 (variant 1).

All remaining high-side switching devices 52 are switched off and all remaining low-side switching devices 54 are switched on, if a short circuit is detected for a low-side switching device 54 of a half-bridge 50 (variant 2).

All remaining high-side switching devices 52 are switched off and all remaining low-side switching devices 54 are switched on, if an interruption is detected for a high-side switching device 52 of a half-bridge 50 (variant 3).

All remaining high-side switching devices 52 are switched on and all remaining low-side switching devices 54 are switched off, if an interruption is detected for a low-side switching device 54 of a half-bridge 50.

Provision is thus made for different predetermined switching configurations in accordance with which it is possible to ensure short-circuiting of a set of windings 18. The switching positions of the non-faulty switching devices 52, 54 are ensured by the respective control device 16. In particular, the predetermined switching configurations may enable a damping function according to option 84 even in the event of faulty switching devices 52, 54 depending on the respective fault state. The steering capability of the steering system 62 is thereby advantageously ensured for a longer period, even in the event of a fault.

The invention claimed is:

1. A method for operating a steering system comprising at least one steering device that is able to be adjusted by way of at least one electric motor that is driven by a power converter, wherein the power converter has at least two regulation tracks each track having at least one set of windings, at least one sensor assigned to the set of windings, a control device and a plurality of switching devices, wherein the control devices, which are assigned to different regulation tracks, are coupled to one another by way of a coupling device, wherein the method comprises at least the following steps:
   A) receiving at least one sensor signal from the respective sensor of a regulation track and/or one drive signal from a vehicle control device, wherein a steering angle requirement is determined for the steering system based on the sensor signal and/or the drive signal,
   B) dividing the steering angle requirement into track requirements by way of the coupling device, which provides the track requirements to the control devices of the different regulation tracks, which are assigned to different sets of windings,
   C) controlling the switching devices of a regulation track, which are each assigned to a set of windings, by control signals of the respectively assigned control device such that motor currents are output to the respective set of windings of the regulation track, which motor currents correspond to the respective track requirement, and
   D) detecting a fault state of the steering system, wherein, depending on the detected fault state:
      a. at least one adapted track requirement is output to at least one control device for at least one regulation track, and/or
      b. a damping function is applied for at least one set of windings of a regulation track.

2. The method as claimed in claim 1, wherein the output motor currents are monitored, and wherein a fault state is triggered in an event of a deviation from a respective standard interval.

3. The method as claimed in claim 1, wherein, if a fault state of a regulation track is detected, the at least one adapted track requirement is such that a failure of the faulty regulation track is compensated for with regard to the steering angle requirement.

4. The method as claimed in claim 1, wherein the steering system has a front-axle steering device and/or a steering angle input device,
   wherein it is possible to trigger a damping function for the front-axle steering device only if a fault state is detected in which none of the regulation tracks that are assigned to the front-axle steering device outputs motor currents such that the steering angle requirement is ensured, and/or
   wherein it is possible to trigger a damping function for the steering angle input device if a fault state is detected in which at least one of the regulation tracks that are assigned to the steering angle input device outputs motor currents such that the respective track requirement is not ensured.

5. The method as claimed in claim 1, wherein windings of the set of windings for which the damping function is triggered are short-circuited using the switching devices assigned to the set of windings, wherein a short circuit is ensured for the assigned switching devices by at least one predetermined switching configuration.

6. The method as claimed in claim 5, wherein the power converter has a B6 bridge comprising three half-bridges for each regulation track, wherein each half-bridge has a first high-side switching device, a second low-side switching device and an center tap arranged between them for outputting a respective motor current, and wherein the at least one predetermined switching configuration comprises predetermined switching states of the switching devices of the half-bridges of the B6 bridge.

7. The method as claimed in claim 6, wherein different fault states are detected depending on states of the switching devices of the half-bridges of the B6 bridge,
   wherein all remaining high-side switching devices are switched on and all remaining low-side switching devices are switched off if a short circuit is detected for a high-side switching device of a half-bridge,
   wherein all remaining high-side switching devices are switched off and all remaining low-side switching devices are switched on if a short circuit is detected for a low-side switching device of a half-bridge,
   wherein all remaining high-side switching devices are switched off and all remaining low-side switching devices are switched on if an interruption is detected for a high-side switching device of a half-bridge, and
   wherein all remaining high-side switching devices are switched on and all remaining low-side switching devices are switched off if an interruption is detected for a low-side switching device of a half-bridge.

8. The method as claimed in claim 7, wherein faulty switching devices of a regulation track are detected by at least one sensor assigned to the control device of the regulation track, wherein the control device then outputs a corresponding fault signal to the coupling device, and wherein the coupling device outputs an adapted track requirement to at least one other control device in order to compensate for the failure of the faulty regulation track.

9. A steering system comprising at least one steering device that is able to be adjusted by way of at least one electric motor that is driven by a power converter, wherein the power converter has at least two regulation tracks each having at least one set of windings, at least one sensor assigned to the set of windings, a control device and a plurality of switching devices, wherein the control devices, which are assigned to different regulation tracks, are coupled to one another by way of a coupling device, wherein the steering system is configured to carry out the method as claimed in claim 1 by way of the coupling device, the control devices, the sensors and the switching devices.

10. The steering system as claimed in claim 9, wherein the steering system furthermore has phase isolation devices that act between half-bridges and the electric motor and are configured to isolate the half-bridges from the electric motor in an event of a short circuit of one of the switching devices.

11. A vehicle having a steering system as claimed in claim 9.

12. The method as claimed in claim 2, wherein, if a fault state of a regulation track is detected, the at least one adapted track requirement is such that a failure of the faulty regulation track is compensated for with regard to the steering angle requirement.

13. The method as claimed in claim 12, wherein the steering system has a front-axle steering device and/or a steering angle input device, wherein it is possible to trigger a damping function for the front-axle steering device only if a fault state is detected in which none of the regulation tracks that are assigned to the front-axle steering device outputs motor currents such that the steering angle requirement is ensured, and/or wherein it is possible to trigger a damping function for the steering angle input device if a fault state is detected in which at least one of the regulation tracks that are assigned to the steering angle input device outputs motor currents such that the respective track requirement is not ensured.

14. The method as claimed in claim 13, wherein windings of the set of windings for which the damping function is triggered are short-circuited using the switching devices assigned to the set of windings, wherein a short circuit is ensured for the assigned switching devices by at least one predetermined switching configuration.

* * * * *